(12) United States Patent
Argoety et al.

(10) Patent No.: US 11,907,367 B2
(45) Date of Patent: Feb. 20, 2024

(54) DORMANT ACCOUNT IDENTIFIER

(71) Applicant: Microsoft Technology Licensing, LLC, Redmond, WA (US)

(72) Inventors: Itay Argoety, Tel Aviv (IL); Tomer Haimovich, Tel Aviv (IL); Amir Harar, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/692,545

(22) Filed: Nov. 22, 2019

(65) Prior Publication Data

US 2021/0157907 A1    May 27, 2021

(51) Int. Cl.
*G06F 21/55* (2013.01)
*H04L 9/40* (2022.01)

(52) U.S. Cl.
CPC .......... *G06F 21/552* (2013.01); *G06F 21/554* (2013.01); *H04L 63/20* (2013.01); *G06F 2221/034* (2013.01)

(58) Field of Classification Search
CPC ....... G06F 21/552; G06F 21/554; H04L 63/20
USPC ......................................................... 726/22
See application file for complete search history.

(56) References Cited

U.S. PATENT DOCUMENTS

| | | | |
|---|---|---|---|
| 9,288,202 B1 * | 3/2016 | Felton | H04L 63/083 |
| 10,609,218 B1 * | 3/2020 | Moller | H04M 3/42195 |
| 10,887,325 B1 | 1/2021 | Lin et al. | |
| 11,295,241 B1 | 4/2022 | Badawy et al. | |
| 2015/0101053 A1 | 4/2015 | Sipple | |
| 2015/0373043 A1 | 12/2015 | Wang et al. | |
| 2017/0193514 A1 * | 7/2017 | Chen | G06Q 20/108 |
| 2017/0324760 A1 | 11/2017 | Gorny et al. | |
| 2018/0027006 A1 | 1/2018 | Zimmermann et al. | |
| 2018/0082192 A1 | 3/2018 | Cormier et al. | |
| 2018/0131661 A1 | 5/2018 | He et al. | |
| 2018/0139227 A1 | 5/2018 | Martin et al. | |
| 2018/0241764 A1 | 8/2018 | Nadolski et al. | |
| 2018/0329977 A1 | 11/2018 | Soceanu et al. | |
| 2020/0045064 A1 | 2/2020 | Bindal et al. | |
| 2021/0073828 A1 * | 3/2021 | Dutta | G06Q 40/02 |
| 2021/0142209 A1 | 5/2021 | Patil et al. | |
| 2021/0216928 A1 | 7/2021 | O'toole et al. | |
| 2021/0266323 A1 | 8/2021 | Jani et al. | |
| 2022/0075788 A1 | 3/2022 | Kalou et al. | |
| 2022/0086162 A1 | 3/2022 | Badawy et al. | |
| 2022/0277402 A1 * | 9/2022 | Ikeda | G06Q 50/00 |

(Continued)

FOREIGN PATENT DOCUMENTS

WO    2019220363 A1    11/2019

OTHER PUBLICATIONS

"International Search Report and Written Opinion Issued in PCT Application No. PCT/US2020/057267", dated Dec. 23, 2020, 11 Pages.

(Continued)

*Primary Examiner* — Anthony D Brown
(74) *Attorney, Agent, or Firm* — Wade IP Law PLLC

(57) ABSTRACT

A dormant account identifier is disclosed. An inactive account can be determined based on whether a user activity of the account is outside a threshold amount. A determination can be made as to whether the inactive account is a dormant account based on account activity of a peer account to the inactive account.

20 Claims, 3 Drawing Sheets

(56) References Cited

U.S. PATENT DOCUMENTS

2022/0292417 A1 9/2022 Hen et al.
2022/0329612 A1 10/2022 Verma et al.

OTHER PUBLICATIONS

"Non Final Office Action Issued in U.S. Appl. No. 17/197,480", dated Jun. 6, 2022, 21 Pages.
Das, et al., "Modeling User Communities for Identifying Security Risks in an Organization", In the Proceedings of IEEE International Conference on Big Data, Dec. 11, 2017, pp. 4481-4486.
Li, et al., "Generating Interpretable Network Asset Clusters For Security Analytics", In Proceedings of IEEE International Conference on Big Data, Dec. 10, 2018, pp. 2972-2979.
Lin, et al., "BEAM: An Anomaly-Based Threat Detection System for Enterprise Multi-Domain Data", In Proceedings of IEEE International Conference on Big Data, Dec. 10, 2020, pp. 2610-2618.
"International Search Report and Written Opinion Issued in PCT Application No. PCT/US22/018588", dated Jun. 24, 2022, 14 Pages.
"Final Office Action Issued in U.S. Appl. No. 17/197,480", dated Feb. 28, 2023, 24 Pages.
"Non Final Office Action Issued in U.S. Appl. No. 17/197,480", dated Sep. 14, 2023, 33 Pages.

\* cited by examiner

DORMANT ACCOUNT IDENTIFIER

BACKGROUND

Computer networks, which can include cloud-computing environments, can be configured to allow users in an enterprise to access enterprise resources via user accounts. In one example, a computer network may implement the user accounts via a program or service including features of an account manager, which may include features of an identity management system. Identity management, or identity and access management (or IAM) systems can include a framework of applicable services and policies of an enterprise to provide proper user access to enterprise resources including applications, files, and data. Identity and access management systems can fall under the overarching umbrella of information technology and data management. IAM systems can identify, authenticate, and authorize users and hardware of an enterprise and permit appropriate access to enterprise resources in a computer network. For example, an IAM system may authenticate a user and a user's computing device such as via a secure log in to a network and apply a set of policies to the user to permit access to applications or data depending on whether the user has permission to access the application or data. The IAM system can also provision user accounts, track use of the accounts, and log events or operations of the accounts. An IAM system may store data for each user account including data that authenticates the identity of a user such as user names and passwords, and data that describes permissions and actions the user is authorized to access or perform on the resources.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The present disclosure is directed to an identifier of dormant user accounts. Dormant user accounts can pose a security issue for an enterprise. For example, threat actors, such as hackers or unauthorized users, may seek access to paths to sensitive enterprise information via accounts of users who have changed positions within an enterprise or who have left the enterprise.

The dormant account identifier can determine whether inactive accounts are dormant accounts. Determinations can be made to deprovision the dormant accounts. An inactive account can be determined based on whether a user activity of the account is outside a threshold amount. For example, an inactive account can include an account having a date of last use that exceeds a threshold amount as determined. A determination can be made as to whether the inactive account is a dormant account, such as an account that should be deprovisioned, based on account activity of a peer account to the inactive account, including a plurality of peer accounts to the inactive account. For example, a determination can be made as to whether the inactive account is a dormant account based on a frequency of use of a peer account to the inactive account. In another example, a determination can be made as to whether the inactive account is a dormant account based on a date of last use and a frequency of use of a peer account to the inactive account. Peer accounts can be determined or selected from security group peers, organizational tree peers, collaboration peers, behavior peers, or other peers. By considering the activity of the peer accounts, the determination of whether an inactive account is indeed a dormant account can reduce potential false positive determination based on user inactivity alone In one example, dormant account identifier can be implemented as a stand-alone program to run on a processor or a computing device, or the dormant account identifier can be part of an infrastructure or platform as a service such as for a cloud tenant or as a software as a service. In one example, of the dormant account identifier receives account activity information for a set of accounts of the enterprise including a user account and the peer accounts. For instance, the dormant account identifier can track the account activity directly or receive the account activity from an account manager or other resources of the enterprise. The dormant account identifier may take a security action on a dormant account, such as deprovision the dormant account or search for suspicious activity of the dormant account.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
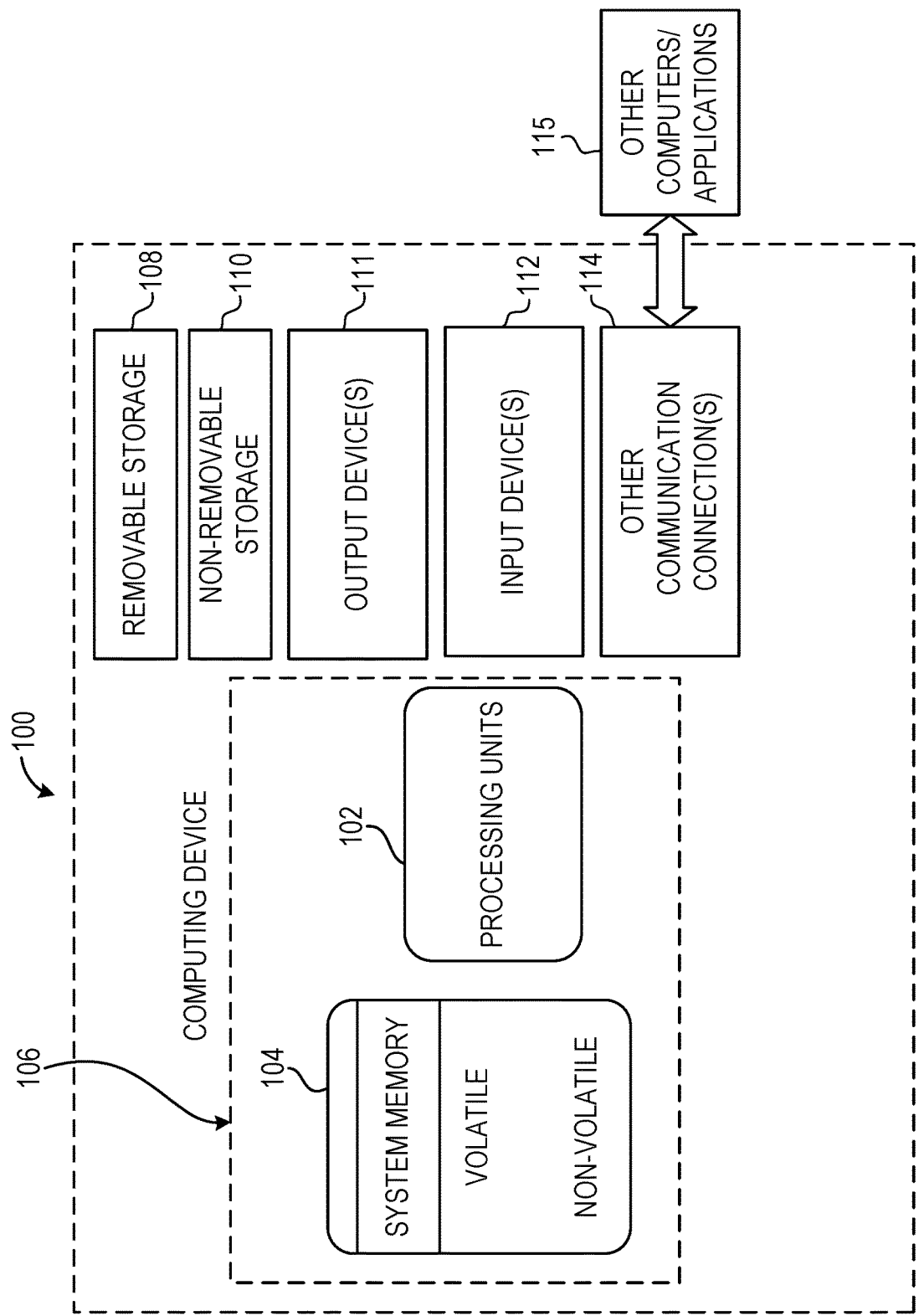
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

A hybrid cloud is a deployment model that includes two or more clouds, such as private clouds, public clouds, and community clouds or combinations of two or more of each deployment model, that remain unique entities. Hybrid clouds include technology to bind together the two or more clouds, and in some examples permit data and application portability across clouds, such as cloud bursting for load balancing, and service interoperability.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
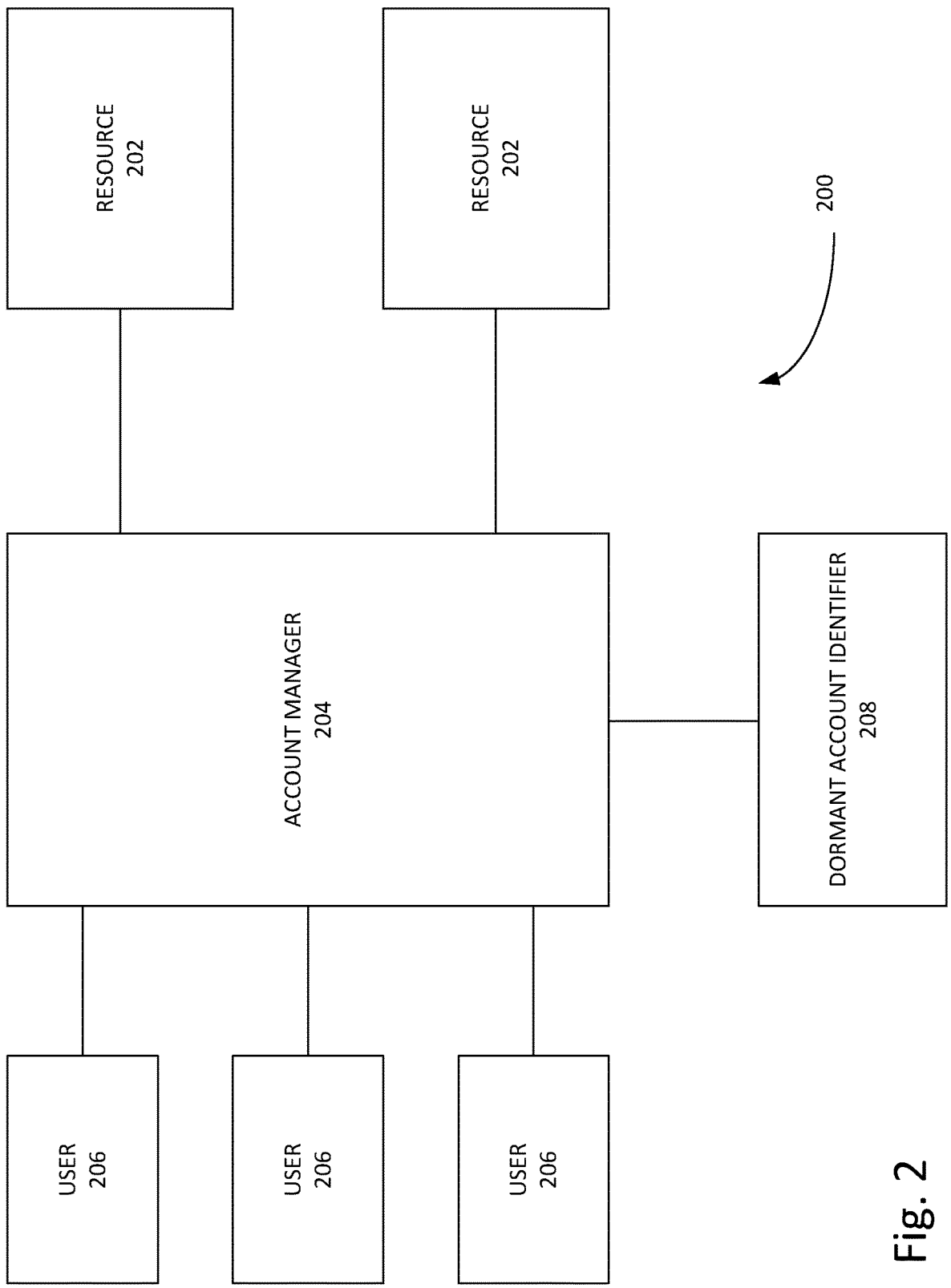
FIG. 2 is a schematic diagram illustrating an example a computer network including a dormant account identifier.

FIG. 2 illustrates an example computer network 200. In one example, the computer network 200 includes a private network, such as a private cloud, for an enterprise in which to deploy applications and data for use by members of the enterprise, such as employees, having accounts configured in the network. In another example, the computer network 200 includes a cloud-computing environment, such as a public cloud, to deploy applications and data on a platform and infrastructure across selected datacenters in which an enterprise includes the capabilities provided to a cloud tenant to deploy applications and data as cloud-based assets to the computer network 200 for use by members of the enterprise via accounts. The computer network can include resources 202 available from one or more resource providers. A resource 202 can include a component of the application to be provisioned in a platform subscription and provides an item of the platform solution. Examples of resources 202 can include virtual machines, databases, virtual networks, and others. Resources 202 can be user-managed entities, entities automatically managed by a platform with the computer network 200, or a combination of user-managed and automatically managed entities. Resource providers include services that provide resources such as services to create, configure, and manage operations for working with the resource 202. Examples of resource providers include a compute provider to supply a virtual machine resource, storage provider to supply a storage account resource, web provider to supply resources related to web applications, and other resource providers.

The computer network can also include an account manager 204 that provisions user accounts and, in some examples, tracks user accounts and logs events or operations of the users via the accounts. In some examples, the resources 202 are available to authorized users through the account manager 204, which may include various subsets of members of the enterprise, and each user may have further restrictions via permissions from a set of permission levels to each authorized user for each resource 202 in the computer network 200. In one example, the a username and password are used to gain access to the resources 202, and the account manager 204 may implement a single sign on technique such that once the user has accessed the account, the user may access a number of the resources 202 without having to gain authorized access from the account manager 204. The account manager 204 can implement the restrictions or permission levels to the accounts or may work with a system that assigns the restrictions or permission levels. In one example, the account manager 204 is a program running on the computer network 200. For instance, the account manager can be a stand-alone program or as part of a larger identity and asset manager solution of the enterprise. In one example, the account manager 204 can be implement as a service, such as an identity as a service offering from a service provider. In one configuration, account manager 204 is an example resource 202 of the computer network 200.

Users 206 can access the resources 202 via accounts provided with account manager 204. For example, users 206 operating computing devices can access the resources 202 via enterprise-provided computing devices directly coupled to a private enterprise network. In some examples, users 206 may access the resources 202 via personally-provided computing devices (bring your own device, or BYOD) or enterprise-provided computing devices over a computer network such as the internet coupled to the computing network 200. For example, users 206 may access the computer network from enterprise premises or remote locations via accounts. Users 206 logged into an account may also communicate with each other, such as via resources 202 including e-mail programs and messaging applications, or collaborate with each other via resources 202 such as collaboration software or file sharing programs and services.

Users 206 may log in and access the resources 202 with a live or open account. In one example, the account manager 204 may be used to close an account. If an account is closed, the user 206 is no longer be able to access the resources via the account. An account may be closed for a number of reasons such as the user is no longer with the enterprise, the user has moved positions in the enterprise to one that does not have access to resources 202, or another account was opened for the user. In some examples, a user may change status within the enterprise, a manager or human resources person will typically notify an administrator of the computer network 200 of the change in the status of the user 206, and the administrator of the computer network 200 will close the account of the user. In some cases, this procedure is implemented efficiently and the user account is quickly closed in response to the change in user status. In other cases, communications and actions may be delayed or not taken, and the account remains open despite the intention or expectation that the account is to be closed. Open accounts that are believed to be closed or intended to be closed are a common example of a dormant user account or dormant account. Other, perhaps less common examples of dormant user accounts include accounts unintentionally or mistakenly open by individuals such as administrators of the computer networks. A large percentage of security personnel recently surveyed believe their computer networks have several dormant accounts that are yet to be discovered and closed.

Dormant user accounts can pose a security issue for the computer network 200. For example, threat actors, such as hackers or unauthorized users, may seek access to paths to sensitive enterprise information via accounts of users who have changed positions within an enterprise or who have left the enterprise. Dormant accounts are common and can represent miscommunication or delay between management or human resources in an organization and its security administrators. Threat actors may scour social media or other data sources for information on individuals who have changed positions with respect to an enterprise. Live or open accounts no longer in use can provide fruitful vectors for attack and allow threat actors to quietly probe for significant periods of time without alerting suspicion in the computer network 200. Even if the user account does not have significant access, threat actors may apply techniques to progressively move through the computer network 200 to search for data and assets that may be the targets of an attack campaign.

The computer network 200 includes a dormant account identifier 208. Dormant account identifier 208 in one example can enhance a security posture of the computer network 200 and reduce its attack surface. The dormant account identifier 208 can be used to identify dormant accounts on the computer network 200 and may include the ability to remove dormant accounts or further hunt for suspicious activities of dormant users. The dormant account identifier 208 can include a computer readable storage device to store computer executable instructions to control a processor, such as a server in a datacenter. In one example, dormant account identifier 208 can be implemented as part of an infrastructure or platform as a service such as for a cloud tenant. In another example, dormant account identifier 208 can be implemented as a software as a service such as for subscribers in other clouds, hybrid clouds, or private networks. In one example, the dormant account identifier 208 can be implemented as a computer program to run a processor.

The dormant account identifier 208 receives or tracks information such as the date of last use and frequency of use of the accounts it monitors. In one example, the information regarding dates of use of an account can be provided from a resource 202, such as the account manager 204. The dormant account identifier 208 or other resource 202 can process dates of use of an account to determine frequency of use of an account, such as amount of times an account was accessed or used over a selected period of time. If an account appears to be inactive for a given period of time, the dormant account identifier 208 determines whether the account is a dormant account. For instance, if the date of last use exceeds a threshold amount, for example a threshold amount can be 180 days, the dormant account identifier will determine the account to be inactive and proceed to determine if the account is dormant. For an inactive account, the frequency of use of the peers of the user are determined. If the peers are frequently active, such as the frequency of use of the peer accounts exceed a given frequency amount, the inactive account is marked dormant. The dormant account identifier 208 can alert an administrator and deprovision the dormant account.

The dormant account identifier 208 can be a stand-alone program or service used with the computer network 200 or can be integrated into a suite of security offerings in a program or service, such as security service. Security service including the dormant account identifier 208 can provide a variety of features to protect and secure the resources 202, which can include account manager 204, and users 206 from malicious communication or other threats. Security service can include isolation features to prevent unauthorized or unintentional transfer of data between deployments of a multi-tenant architecture. Additionally, security service can include network and endpoint protection in the form of firewalls and virtual firewalls. Security service can provide for logging and monitoring events including security-related events with agents on each compute, storage, or fabric node in environment. Security service including the dormant account identifier 208 can include a computer readable storage device, such as a suite of computer readable storage devices, to store computer executable instructions to control a processor, such as a server in a datacenter. For example, security services including the dormant account identifier 208 can be implemented as part of an infrastructure or platform as a service such as for the computer network 200.

Figure 3:
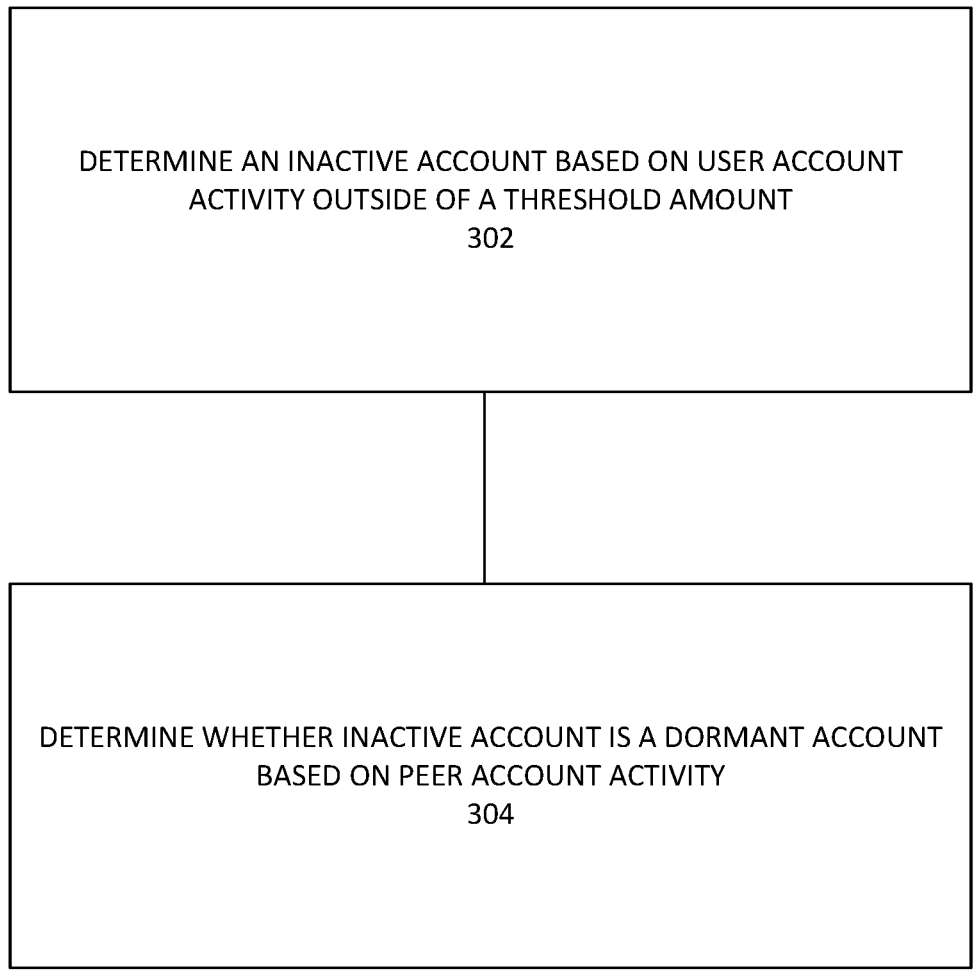
FIG. 3 is a block diagram illustrating an example method, such as a method of the dormant account identifier of FIG. 2.

FIG. 3 illustrates an example method 300 of a dormant account identifier, such as dormant account identifier 208. Method 300 can be implemented to include a combination of one or more hardware devices and computer programs for controlling a system, such as a computing system having a processor and memory, to perform method 300. For instance, dormant account identifier 208 and method 300 can be implemented as a computer readable medium or computer readable storage device having set of executable instructions for controlling the processor to perform the method 300. An inactive account can be determined based on whether a user activity of the account is outside a threshold amount at 302. For example, an inactive account can include an account having a date of last use that exceeds a threshold amount as determined at 302. In another example, an inactive account can include an account having a frequency of use that is within a threshold amount, such as two uses in the last six months, as determined at 302. A determination can be made as to whether the inactive account is a dormant account, such as an account that should be deprovisioned, based on account activity of a peer account to the inactive account, including a plurality of peer accounts to the inactive account at 304. For example, a determination can be made as to whether the inactive account is a dormant account based on a frequency of use of a peer account to the inactive account at 304. In another example, a determination can be made as to whether the inactive account is a dormant account based on a date of last use and a frequency of use of a peer account to the inactive account at 304.

As part of 302, information is received regarding activity on a plurality of accounts. For example, the dormant account identifier 208 can receive information on activity for a user account and information on activity of a peer of the user account. In one instance, information on activity of a plurality of peers is received. Information can be received from various sources, such as the resources 202 including the account manager 204. In another example, dormant account identifier 208 can track the information on use of the account. In one example, the dormant account identifier 208 constantly monitors the account activity on the network and constantly determines whether a date of last use exceeds a threshold amount and other information. In another example, the dormant account identifier 208 occasionally monitors account activity. In still another example, the dormant account identifier 208 receive information on account activity, such as downloading information from logs, when directed by an administrator. Information on account activity can include dates and times of successful login sessions, dates and times of logging out of sessions, dates and times of use of resources 202 during a session, and resources used during a session.

From the account information received, determinations are made as to whether a date of last use of the account has exceeded a threshold amount at 302. A threshold amount can be selected or adjusted based on an appropriate threshold for the enterprise. In one example, accounts may be monitored with multiple threshold amounts. For instance, a first user account may correspond with a first threshold amount and a second user account may correspond with a second threshold amount. The first user may be inclined to be more active than the second user, and so the first threshold amount may be less than the second threshold amount. In one example, the threshold amount applied to an account is the same threshold amount applied to the user account peers. The threshold amount may be set in terms of days, such as 180 days, or other amount of time. In this example, if a user account has not been active, such as the user account has not logged onto a session or accessed resource 202, in over 180 days, the user account is marked inactive at 302. In one example, an account having a date of last use that do not exceed the threshold amount can be determined to be an active account at 302.

Information on account activity can also be used to determine a frequency of use. For example, frequency of use can be resolved from an amount of activity over a selected period of time. Frequency of use may correlate with an amount of successful login sessions over a period of time. In one example, the period of time can be measured up to the current time, and, in another example, the period of time can be measured up to the last successful login session for the user of interest.

A peer account, or user peer, of the user account are determined at 304. In one example, the dormant account identifier determines a plurality of user peers, or peers, for an inactive account at 304. The determination of user peers can include the determination of one or more groups of peers. In one example, a first group of peers is determined based on a first criterium. If the first group of peers provides insufficient insight, a second group of peers can be determined based on a second criterium. Additional groups of peers can be determined based on additional criteria. For example, a group of peers can include a plurality of accounts in a security group with the user account. Another example of a group of peers can include a plurality of accounts based on an organizational structure of the enterprise such as a group of accounts in which all the users report to the same manager or work in the same department of the enterprise. Another example of a group of peers can include a plurality of accounts in which all the users collaborate on a selected project, such as all users may collaborate via a collaboration resource 202 or users who frequently send messages, including e-mail, to each other. In still another example of a group of peers can include a plurality of users that include similar behaviors on the computer network 200 such as accounts that use generally the same resources 202. Machine learning can be implemented to determine user peers for each inactive account or for each account user. The user peers may be predetermined prior to designating an account as an inactive account or may be determined after an account is designated as an inactive account.

Information is collected on the user peers to determine corresponding account activity such as date of last use and frequency of use. The criteria to determine account activity can be the same as that applied to the user account to determine whether the account is inactive. Information as to the account activity, such as frequency of use, can be considered or compared the information of the account activity of the inactive account to determine whether the inactive account is dormant. For example, if the user peers of the inactive account are active at a high rate of frequency and well within the threshold amount, the inactive account may be determined to be a dormant account. In one example, the frequency of use of the user peers is first considered, and if indeterminate, the date of last use of the user peers is considered to determine whether the inactive account is a dormant account. In another example, both the date of last use of the user peers and the frequency of use of the user peers are considered to determine whether the inactive account is a dormant account.

In one example of method 300, the dormant account identifier 208 tracks account activity for a plurality of accounts. If an account has been inactive for at least a threshold amount of time, such as six months, the account is marked as inactive at 302. The dormant account identifier 208 can receive account activity information for peer accounts of the inactive account. In one example, the peer accounts are a subset of the plurality of accounts monitored or tracked by the dormant account identifier 208. In one example, the peer accounts may include users that work in same department as the user of the inactive account. In another example, the peer account may include users that frequently collaborate together on a word processing or spreadsheet resource 202 of the enterprise. The dormant account identifier 208 can consider the account activity of the peer accounts. If the peer accounts, for example, have been recently active or frequently active, the inactive account may be designated as a dormant account. If the peer accounts, however, have also been infrequently active, the inactive account may be designated as a non-dormant account, or remain an inactive account. In one example, the user peers may be determined based on another criterium for determining peers, such as users in a security group, the activity of the peer accounts may be reconsidered. For example, if the second group of peer accounts also are infrequently active, the inactive account may be designated as an inactive account.

By considering the activity of the peer accounts at 304, the determination of whether an inactive account is indeed a dormant account can reduce potential false positive determination based on user inactivity alone.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method, comprising:
   determining that an account of a user of an enterprise is an inactive account based on user account activity of the account being outside a threshold amount;
   determining a peer of the user based on at least one of the following:
   the user and the peer of the user working in a same department of the enterprise;
   the user and the peer of the user collaborating in a web-application resource of the enterprise via the user account and a peer account of the peer of the user; and
   determining whether the inactive account of the user is a dormant account based on peer account activity of the peer account of the peer of the user.

2. The method of claim 1 wherein determining the inactive account includes receiving account activity information from a plurality of accounts.

3. The method of claim 1 wherein determining the inactive account includes tracking account activity of a plurality of accounts.

4. The method of claim 1 wherein the account activity outside a threshold amount includes a date of last use that exceeds the threshold amount.

5. The method of claim 1 wherein the date of last use includes a date of a last successful login session.

6. The method of claim 1 wherein an account having a date of last use that does not exceed the threshold amount is an active account.

7. The method of claim 1 wherein the account activity of the peer account includes a frequency of use of the peer account.

8. The method of claim 1 wherein the account activity of the peer account includes a date of last use of the peer account.

9. The method of claim 1 comprising:
deprovisioning the dormant account.

10. The method of claim 1 wherein the determining whether the inactive account is a dormant account is based on peer account activity of a plurality of peer accounts of a plurality of peers of the user in the enterprise with the inactive account of the user.

11. A computer readable storage device to store computer executable instructions to control a processor to:
determine that an account of a user of an enterprise is an inactive account based on user account activity of the account being outside a threshold amount;
determine a peer of the user based on at least one of the following:
the user and the peer of the user working in a same department of the enterprise;
the user and the peer of the user collaborating in a web-application resource of the enterprise via the user account and a peer account of the peer of the user; and
determine whether the inactive account of the user is a dormant account based on peer account activity of the peer account of the peer of the user.

12. The computer readable storage device of claim 11 wherein the user account activity is based on a date of last use of the user account.

13. The computer readable storage device of claim 12 wherein the user account activity is based on whether the date of last use of the user account exceeds the threshold amount.

14. The computer readable storage device of claim 11, the computer executable instructions to control the processor to:
receive the user account activity and the account activity of the peer account.

15. The computer readable storage device of claim 11, the computer executable instructions to control the processor to:
determine a plurality of peer accounts to the inactive accounts.

16. The computer readable storage device of claim 15 wherein the plurality of peer accounts are based on an organizational structure of an enterprise.

17. A system, comprising:
a memory device to store a set of instructions; and
a processor to execute the set of instructions to:
determine that an account of a user of an enterprise is an inactive account based on user account activity of the account being outside a threshold amount;
determine a peer of the user based on at least one of the following:
the user and the peer of the user working in a same department of the enterprise;
the user and the peer of the user collaborating in a web-application resource of the enterprise via the user account and a peer account of the peer of the user; and
determine whether the inactive account of the user is a dormant account based on peer account activity of the peer account of the peer of the user.

18. The system of claim 17 wherein the instructions are implemented with a security service of a cloud environment.

19. The system of claim 17 wherein the threshold amount includes one of a selected amount of time or a frequency of use.

20. The system of claim 17 comprising instructions to deprovision the dormant account.

* * * * *